US006326440B1

(12) United States Patent
Terada et al.

(10) Patent No.: US 6,326,440 B1
(45) Date of Patent: Dec. 4, 2001

(54) BIODEGRADABLE FILM AND PROCESS FOR PRODUCING THE SAME

(75) Inventors: Shigenori Terada, Shiga; Jun Takagi, Tokyo, both of (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 09/554,236

(22) PCT Filed: Nov. 13, 1998

(86) PCT No.: PCT/JP98/05137

§ 371 Date: May 11, 2000

§ 102(e) Date: May 11, 2000

(87) PCT Pub. No.: WO99/25758

PCT Pub. Date: May 27, 1999

(30) Foreign Application Priority Data

Nov. 14, 1997 (JP) .................................................. 9-329711

(51) Int. Cl.$^7$ ........................................................ C08L 67/00
(52) U.S. Cl. ........................ 525/411; 525/437; 525/439; 525/440; 525/450; 525/938

(58) Field of Search ..................................... 525/411, 437, 525/439, 440, 450, 938

(56) References Cited

FOREIGN PATENT DOCUMENTS

| 8-113264 | 5/1996 | (JP) . |
| 9-272794 | 10/1997 | (JP) . |
| 10-146936 | 6/1998 | (JP) . |

*Primary Examiner*—Patricia A. Short
(74) *Attorney, Agent, or Firm*—Wenderoth, Lind & Ponack, L.L.P.

(57) ABSTRACT

A plastic film is provided in which brittleness has been improved, and which is not too soft, and which has practically satisfactory physical properties, heat-sealability stable with time, and biodegradability in natural environment. The film comprises a polylactic acid-family polymer and other aliphatic polyester at the ratio of 80:20 to 20:80, and the heat of fusion $\Delta Hm1$ converted to the polylactic acid-family polymer when the temperature of the film is raised is 35 J/g or under.

8 Claims, No Drawings

BIODEGRADABLE FILM AND PROCESS FOR PRODUCING THE SAME

TECHNICAL FIELD

The present invention relates to a biodegradable film and its manufacturing method, and more particularly to a biodegradable film which decomposes in natural environment and has excellent flexibility, transparency and heat sealability, and to its manufacturing method.

BACKGROUND ART

Most of conventional plastic products, especially plastic packaging materials are discarded soon after use, and their disposal problems are pointed out. Among general purpose packaging plastics, as representative ones, polyethylene, polypropylene, polyethylene terephthalate (hereinafter abbreviated to "PET"), etc. can be cited. But these materials are high in heat buildup when burned and there is a possibility of damaging the incinerator during burning treatment. Further, polyvinyl chlorides, which are large in the amount of use even now, cannot be burned due to their self-extinguishing properties. Also, in many cases, plastic products including such materials which cannot be burned, are buried. But due to their chemical and biological stability, they scarcely decompose but remain, thus causing a problem that they shorten the life of burial sites. Therefore, plastic products that are low in heat buildup during burning, decompose in soil, and safe are desired, and many researches are being made.

As one example, there are polylactic acids. For polylactic acids, the heat buildup during burning is less than half that of polyethylene, and hydrolysis proceeds naturally in soil or water and then they are decomposed by microorganisms into unharmful materials. Now researches are being made for obtaining molded products, specifically film sheets and containers such as bottles using polylatic acids.

Polylactic acid is a polymer formed by condensation-polymerizing a lactic acid. Lactic acids have two kinds of optical isomers, i.e. L-lactic acid and D-lactic acid. Their crystallizability varies with the ratio of structural units. For example, a random copolymer of which the L-lactic acid to D-lactic acid ratio is 80:20 to 20:80 has no crystallizability. In other words, it is a transparent, completely amorphous polymer which softens near its glass transition point of 60° C. On the other hand, for a homopolymer made up of only L-lactic acid or D-lactic acid, although its glass transition point is likewise 60° C., it becomes a semicrystalline polymer having a melting point of 180° C. or over. The semicrystalline polylactic acid turns into an amorphous material that excels in transparency, by rapidly cooling after melt extrusion.

By the way, it is known that the strength and shock resistance of polylactic acids improve by biaxially orienting them. But such a melted and rapidly cooled cast film is very brittle and inconvenient to use as it is. Also, though it can be formed into a bag by heat-sealing and melt-sealing, it allows no elongation at the sealed portion, so that it is liable to tear.

Polylactic acid has only 3–8% elongation when pulled. It is known that it is a brittle material. If it is formed into a film, it is difficult to use without stretching. Thus, it has been tried to improve shock resistance by adding several parts by weight of another aliphatic polyester (Japanese Patent Publication 9-111107). But if these films are left at a temperature slightly higher than room temperature, there is a problem that physical properties such as elongation at break or heat-sealing strength change with time.

The shock resistance can be approximately inferred from the elongation when the film is pulled. For example, elongation of high-molecular films that excel in shock resistance is 500% or over for high-density polyethylenes, low-density polyethylenes and polypropylene, and 50–400% for aromatic polyesters such as PET and nylon. For polystyrenes, crystalline polystyrene (GPPS) as a monomer has an elongation of only 5% or under. But high-impact polystyrenes (HIPS) formed by copolymerizing butadiene have an elongation of 15–50%. Even hard polyvinyl chlorides have an elongation of several tens percent by adding a plasticizer and a shock improver. Many of shock-resistant films have an elongation of at least 10% or over. Films having a greater shock resistance have an elongation of 50% or over.

On the other hand, as biodegradable films having flexibility, films comprising a condensation polymer of an aliphatic multifuntional carboxylic acid and an aliphatic multifunctional alcohol can be cited. One example is a film comprising an aliphatic polyester having diols and succinic acid or adipic acid or both of them as a main structural unit. Such aliphatic polyester films are very supple, high in both tensile elongation and shock resistance, excel in heat-sealability, and can be used in the form of bags.

But for the above-described aliphatic polyesters, it is difficult to suppress the growth of crystals even if they are cooled rapidly after melt-extruding, because both the glass transition point and the crystallization point below room temperature, so that they become opaque. When commercial products are put in bags made of such an aliphatic polyester, they will not be clearly seen and the display effect will be poor. Further, another problem is that the film is too soft.

For example, if another film, paper or metallic foil is laminated on the film, the film is drawn and stretched during the manufacturing steps, and problems such as out-of-register and non-uniform laminating can arise.

A plastic film has been sought in which brittleness has been improved, which is not too soft, which has practically satisfactory physical properties, which has stable heat-sealability with time, and which has degradability in natural environment.

DISCLOSURE OF THE INVENTION

As a result of an ardent study in an attempt to solve the above problems, the present inventors have completed the present invention. The present invention provides a biodegradable film comprising a polylactic acid-family polymer whose fusion heat of crystal $\Delta Hm_2$ when secondary temperature raising is carried out is 3 J/g or under and other aliphatic polyester than the polylactic acid-family polymer at the weight ratio of 80:20 to 20:80, characterized in that the fusion heat $\Delta Hm1$ converted to polylactic acid-family polymer when the temperature of the film is raised is 35 J/g or under.

As a preferred embodiment of the present invention, a biodegradable film can be cited which is characterized in that the aliphatic polyester has a weight-average molecular weight of 20 to 300 thousand and has the structure expressed by the following formula:

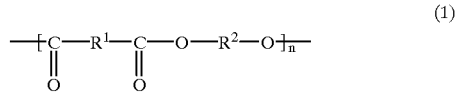

(1)

(wherein R1 and R2 are alkylene or cycloalkylene groups having a carbon number of 2 to 10. n is the degree of polymerization reguired for the weight-average molecular weight to be 20–300 thousand. R1 or R2 may be identical to or different from each other. Also, in the formula, instead of ester-bound residue, urethane-bound residue and/or carbonate-bound residue may be contained up to 5%.)

For the biodegradable film, the glass transition point of the aliphatic polyester should preferably be 0° C. or under. The weight-average molecular weight of the aliphatic polyester should preferably be 150–250 thousand. The weight-average molecular weight of the polylactic acid-family copolymer should be 100–300 thousand.

Hereinbelow, detailed description is made about the present invention.

The polylactic acid-family polymer used in the present invention is a polymer having L-, D- or DL-lactic acid units as a main component. The polylactic acid-family polymer may be a homopolymer of L- or D-lactic acid, or a copolymer of L- and D-lactic acid. Also, it may be a copolymer containing other hydroxy-carboxylic acid unit as a copolymer component in a small amount. Further, these homopolymers or copolymers may contain a small amount of chain extender residue.

As a polymerizing method, any known method such as condensation polymerization and ring opening polymerization may be used. For example, in condensation polymerization, a polylactic acid-family polymer having a desired composition may be formed by directly dehydrating and condensation-polymerizing L-lactic acid, D-lactic acid or a mixture thereof.

In ring opening polymerization (or via-lactide) method, a polylactic acid-family polymer may be formed by polymerizing a lactide which is a cyclic dimer of a lactic acid, using a selected catalyst, and a polymerization adjusting agent if required.

The weight-average molecular weight of the polylactic acid-family polymer used in the present invention should preferably be 60–700 thousand, more preferably 80–400 thousand, and particularly preferably 100–300 thousand. If the molecular weight is too small, practical physical properties such as mechanical properties and heat resistance would reveal little, and if too large, the melt viscosity would be too high and the mold workability be poor.

In the present invention, it is very important to design the fusion heat amount converted to polylactic acid-family polymer of the film comprising a polylactic acid-family polymer and other aliphatic polyester than the polylactic acid-family polymer to a specific range by adjusting the copolymerizing composition and, if necessary, the molecular weight.

If a copolymer is used as a polylactic acid-family polymer, an L- or D-lactic acid may be used as a main monomer. Also, as a monomer to be copolymerized therewith, bifunctional aliphatic hydroxy carbonic acids such as an optical isomer of the above lactic acid (D-lactic acid for L-lactic acid and L-lactic acid for D-lactic acid), glycolic acid, 3-hydroxy butyric acid, 4-hydroxy butyric acid, 2-hydroxy-n-butyric acid, 2-hydroxy-3, 3-dimethyl butyric acid, 2-hydroxy-3-methyl butyric acid, 2-methyl lactic acid, 2-hydroxy caproic acid: lactones such as caprolactone, butyrolactone and valerolactone may be used.

The other aliphatic polyesters used together with a polylactic acid-family polymer in the present invention may be aliphatic polyesters using monomers other than L- or D-lactic acid as a main monomer, such as homopolymers and copolymers of hydroxycarboxylic acids other than L- and D-lactic acids, or polymers having aliphatic (including cycloaliphatic) dicarboxylic acid units and aliphatic (including cycloaliphatic) diol units as a main component. Further, the other aliphatic polyester may be homopolymers or copolymers of hydroxycarboxylic acids other than L- or D-lactic acid, and a block copolymer of polymers having aliphatic dicarboxylic acid units and aliphatic diol units as a main component and the polylactic acid-family polymer. Among them, as the other aliphatic polyester, polymers having aliphatic dicarboxylic acid units and aliphatic diol units as a main component are preferable.

As hydroxycarboxylic acids used for homopolymers and copolymers of hydroxycarboxylic acids other than L- and D-lactic acid, glycolic acid, 3-hydroxy butyric acid, 4-hydroxy butyric acid, 2-hydroxy-n-butyric acid, 2-hydroxy-3, 3-dimethyl butyric acid, 2-hydroxy-3-methyl butyric acid, 2-hydroxy valeric acid, 2-methyl lactic acid, 2-hydroxycaproic acid may be used. A polymerizing method for obtaining homopolymers and copolymers of hydroxycarboxylic acids other than L- and D-lactic acid may be the same as the polymerizing method used for polylactic acid-family polymer.

Also, the polymer having aliphatic dicarboxylic acid units or aliphatic diol units as a main component, may contain, as a small mount of copolymer, (a) carboxylic acid, alcohol, or hydroxycarboxylic acid units of three or more functional groups, (b) nonaliphatic dicarboxylic acid units and/or nonaliphatic diol units, or (c) lactic acid and/or hydroxycarboxylic acid units other than lactic acid.

Also, a small amount of chain extender residue may be contained.

In order to prepare the aliphatic polyester, a known method such as a direct method or an indirect method may be employed. In the direct method the aliphatic carboxylic acid unit and the aliphatic alcohol unit are directly polymerized while removing moisture contained therein or produced during polymerization to obtain a high-molecular weight polymer. The indirect method is a manufacturing method in which after polymerized to oligomers, the molecular weight is increased using a small amount of a chain-lengthening agent as with the polylactic acid-family polymer.

As the aliphatic dicarboxylic acid unit, aliphatic dicarboxylic acids such as succinic acid, adipic acid, suberic acid, sebacic acid, dodecanoic diacid, or their anhydrides or derivatives may be used. On the other hand, as the aliphatic alcohol unit, aliphatic diols such as ethylene glycol, butanediol, hexanediol, octanediol, cyclopentadiol, cyclohexanediol, cyclohexanedimethanol, or their derivatives may be used. One having a bifunctional component as a main component and alkylene or cycloalkylene groups having a carbon number of 2–10 is preferable. Of course, for either of such carboxylic acid and alcohol, two or more kinds may be used.

In the present invention, preferable aliphatic polyesters have a weight-average molecular weight of 20 to 300 thousand and a structure expressed by the following formula (1):

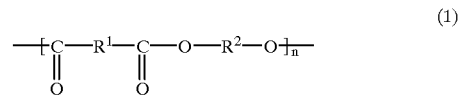

(1)

(Wherein R1 and R2 are alkylene or cycloalkylene groups having 2 to 10 carbon atoms. n is the degree of polymerization required for the weight-average molecular weight to be 20–300 thousand. R1 or R2 may be identical to or different from each other. Also, in the formula, instead of ester-bound residual groups, urethane-bound residual groups and/or carbonate-bound residual groups may be contained up to 5%.)

If the weight-average molecular weight of the aliphatic polyester is too small, the properties as a polymer will be inferior, and in particular, heat-sealability will be poor, and the film may bleed with lapse of time. If too large, the melt viscosity will be too high. This will incur a reduction in the miscibility with polylactic acid-family polymer and extrusion moldability when it is formed into a film, like a polylactic acid-family polymer. In view of these points, the weight-average molecular weight of the aliphatic polyester should preferably be 150–250 thousand.

For improved shock resistance and cold resistance, it is preferable that the glass transition point (Tg) of the aliphatic polyester is not higher than 0° C.

As especially preferable aliphatic polyesters, polyethylene suberate, polyethylene sebacate, polyethylene decanedicarboxylate, polybutylene succinate, polybutylene adipate, polybutylene sebacate, polybutylene succinate adipate or their copolymers can be cited.

Also, for the purpose of providing branches in the polymer to improve the melt viscosity, 3 or more functional carboxylic acids, alcohols or hydroxycarboxylic acids may be used. Specifically, multifunctional components such as malic acid, tartaric acid, citric acid, trimellitic acid, pyromellitic acid, pentaerythritol and trimethylol propane may be used.

If these components are used in large amounts, the polymer obtained will have a crosslinked structure and become non-thermoplastic, or even if thermoplastic, microgels having a partially highly crosslinked structure may be produced, so that there is a possibility that when it is formed into a film, a fish eye may be formed. Thus, the content of such a multifunctional component in the polymer should be very small, and is limited to such an amount that the chemical and physical properties of the polymer will not be substantially influenced.

Further, if necessary, as a small amount of copolymerizing component, nonaliphatic dicarboxylic acids such as terephtahlic acid and/or nonaliphatic diols such as ethylene oxide adducts of bisphenol A, or lactic acid and/or hydroxycarboxylic acid other than lactic acid may be used.

In the present invention, as described above, as the aliphatic polyester, homopolymers or copolymers of hydroxycarboxylic acids other than L- or D-lactic acid and block copolymers (including partially ester-exchanged products and products containing a small amount of chain extender residue) of polymers having aliphatic dicarboxylic acid units and aliphatic diol units as main components (hereinafter referred to as "block copolymer components") and the polylactic acid-family polymer can be used.

These block copolymers may be prepared by any known method. For example, one of a polylactic acid-family polymer and a block copolymer component is prepared as a separate polymer, and in the presence of the polymer, the other structural monomer is polymerized. Normally, by polymerizing a lactide in the presence of a pre-prepared block copolymer component, a block copolymer of polylactic acid and the block copolymer component can be obtained. Basically, it differs only in that the block copolymer component coaxists, but polymerization may be conducted as in preparing a polylactic acid-family polymer by the lactide method. At the same time when polymerization of lactide proceeds, ester exchange reaction occurs between the polylactic acid and the block copolymer component, so that a copolymer is obtained which is relatively high in randomness. If an aliphatic polyester urethane having a urethane bond is used as a starting material, an ester-amide exchanger is also produced.

In the biodegradable film of the present invention, the ratio of the polylactic acid-family polymer and the other aliphatic polyesters should be, in weight ratio, 80:20–20:80, preferably 70:30–30:70. In other words, the ratio of the aliphatic polyester component to the total amount of the polylactic acid-family polymer and the aliphatic polyester should be within the range of 20–80 wt %. In view of the balance between flexibility and transparency of the film, it is possible to achieve excellent properties by adjusting the contents of these two polymers to each other within the range. If the ratio of the aliphatic polyester is too small, though depending upon the manufacturing method, the elongation of the film will be less than 10%, so that it will be too brittle for use. In order to improve the shock resistance, it is necessary that the content of the aliphatic polyester be 20% by weight or over, preferably 30% or over. On the other hand, if the content of the aliphatic polyester is too large, due to spherulite of the aliphatic polyester, it will be somewhat opaque as a whole, and also be limp, and thus become unsuitable for printing and laminating. A yardstick is that the elastic modulus be 80 kgf/mm$^2$ or over. If the rate is within the range, a required elastic modulus can be attained.

In the biodegradable film of the present invention, in order to achieve a sufficient heat-sealability, it is important to select a suitable polylactic acid-family polymer used for the manufacture of film under a certain standard.

The inventors have found out that the heat-sealability is not impaired with time if the amount of heat for fusion of the polylactic acid-family polymer is small. According to the present invention, in the film comprising the polylactic acid-family polymer and the other aliphatic polyester, it is one requirement for heat-sealability that the heat amount for fusion Hm1 converted to the polylactic acid-family polymer when the temperature of the film is raised is 35 J/g or under.

In the present invention, the fusion heat ($\Delta H$) of a film specimen measured by differential scanning calorimetry (DSC) under JIS-K7122 is converted by the following formula into the polylactic acid-family polymer-converted fusion heat amount ($\Delta Hm1$).

$$\Delta Hm_1 \text{ (J/g)} = \Delta H \text{ (J/g)} \div \text{content (\%) of polylactic acid in the film} \times 100$$

Incidentally, for a homopolymer of L-lactic acid, it is about 50 J/g.

Also, in order to obtain a film that meets the above requirements, it is important to use a specific polylactic acid-family polymer. We have found out that it is important to use a polylactic acid-family polymer having a fusion heat amount of crystal $\Delta Hm_2$ when the polylactic acid-family polymer as a material is subjected to secondary heating, in other words, when it is melted, cooled into an amorphous state, and then heated again is 3 J/g or under. With one having a fusion heat amount $\Delta Hm_2$ of over 3 J/g, by mixing with the other aliphatic polyester, crystallization will proceed easily. Specifically, by leaving it at a temperature slightly higher than room temperature, i.e. 50° C. for only one day or two, low-temperature heat-sealability (at temperatures from 80° C. to the melting point of polylactic acid) will be lost, so that a sufficient sealing strength can not be obtained.

The fusion heat amount of crystal $\Delta Hm_2$ when the polylactic acid-family polymer is subjected to secondary heating is also measured by differential scanning calorimetry (DSC) under JIS-K7122. But it is the fusion heat amount when the temperature of the polymer is raised at a predetermined rate until it is fully melted, then it is lowered to a temperature lower than room temperature at a rate faster than the predetermined rate, and it is raised again at a predetermined rate.

Mixing of the polylactic acid-family polymer and the other aliphatic polyester may be carried out by putting the raw materials into the same extruder. In one method, a film is directly manufactured by extruding through the cap as it is. In another method, pellets are manufactured by extruding in the form of strands and then a film is manufactured by extruding from the extruder again. In either method, it is necessary to avoid lowering of the molecular weight due to decomposition. But for uniform mixing, the latter method is more preferable.

The polylactic acid-family polymer and the aliphatic polyester are melted in an extruder after drying sufficiently to remove moisture. Considering that the melting point of the polylactic acid-family polymer changes according to the composition ratio of the L-lactic acid unit and D-lactic acid unit, and the melting point of the aliphatic polyester and the mixing ratio of the aliphatic polyester, the temperature for melt extruding should be suitably selected. It should be usually 100 to 250° C.

To the mixture, for adjusting various physical properties, a heat stabilizer, light stabilizer, light absorber, lubricant, plasticizer, inorganic filler, colorant and pigment may be added.

EXAMPLES

Although Examples are shown below, the present invention are by no means limited thereto. The measurement and evaluation shown in the Examples were conducted under the following conditions.

(1) Fusion Heat Amount ($\Delta Hm_1$) Derived from the Polylactic Acid in the Film Using DSC-7 made by Perkin Elmer, fusion heat was measured under JIS-K7122. 10 mg of a test piece taken from the film was state-adjusted in a standard state, and the heat-absorbing peak area derived from fusion of the polylactic acid was read from a DSC curve drawn while the temperature was raised to 200° C. at a rate of 10° C./min with the nitrogen gas flow rate at 25 ml/min to determine the fusion heat ($\Delta H$) of the test specimen. This was converted by the following formula to the fusion heat amount ($\Delta Hm_1$) derived from the polylactic acid in the film.

$$\Delta Hm_1 \text{ (J/g)} = \Delta H \text{ (J/g)} \div \text{content (\%) of polylactic acid in the film} \times 100$$

(2) Fusion Heat Amount of Crystal $\Delta Hm_2$ of Polylactic Acid-family Polymer Using DSC-7 made by Perkin Elmer, fusion heat for crystallization was measured under JIS-K7122. Specifically, 10 mg of a test piece taken from the material polymer was state-adjusted in the standard state, and put in a container of the DSC device. The temperature was raised to 200° C. at the rate of 10° C./min with the nitrogen gas flow rate at 25 ml/min. The specimen was completely melted by holding it for 2 minutes at 200° C., the temperature was lowered to room temperature (23° C.) at the rate of 30° C./min, and held for 2 minutes. The temperature was raised again (that is, secondary temperature raising) under the same conditions as the temperature-raising conditions. The fusion heat of crystal ($\Delta Hm_2$) of the test piece was measured by reading the heat-absorbing peak area derived from the crystallization fusion of the polylactic acid from the DSC curve drawn during temperature raising to 200° C.

(3) Tensile Elongation

The elongation until the film breaks was measured under JIS-K-7127.

Using Type IM20 Tensile Tester made by INTESCO, measurement was made at a temperature of 23° C., and relative humidity of 50% with a distance between lines of 25 mm, distance between chucks of 80 mm, tensile speed of 100 mm/min. The longitudinal direction of the film was indicated as MD and the width direction was indicated as TD.

(4) Tensile Modulus

Using Type IM20 Tensile Tester made by INTESCO, measurement was made at a temperature of 23° C. and a relative humidity of 50%. The film was cut to strips of 5 mm wide and 300 mm long. A tensile test was conducted with the chuck distance set at 250 mm and the tensile speed of 5 mm/min. The tensile modulus was measured by measuring the strength and strain which is one half of the yield point strength. The lower the value, the more flexible the film. The longitudinal direction of the film was indicated as MD and the width direction was indicated as TD.

(5) Heat-seal Strength

Two film specimens cut out of a 40 $\mu$m-thick film to the size of 100 mm in a longitudinal direction and 15 mm in a width direction were superposed one on the other, and one end was heat-sealed by the width of 10 mm in a perpendicular direction to the longitudinal direction. The seal width was 15 mm×10 mm. For seal, a temperature-controllable, 10 mm-wide heating metal bar was used. The sealing time was constantly one second at a temperature of 140° C. and a pressure of 1.0 kgf/cm$^2$. Also, in order that film specimens would not stick to the seal bar, a tape comprising a Teflon substrate was stuck on the heat transmission surface of the heating bar. Heat-sealing was carried out for two kinds of the same film, one immediately after manufacture and the other after 24-hour aging in a constant-temperature bath kept at 50° C., and the peeling strength was measured and evaluated for each.

The peeling strength was measured by use of Type IM20 Tensile Tester made by INTESCO with a chuck-to-chuck distance of 80 mm and a tensile strength of 100 mm/min while spreading one end with the other end sealed. The peeling strength is indicated in kgf per 15 mm.

(6) Weight-average Molecular Weight

Using a gel permeation chromatograph HLC-8120GPC made by TOSOH Corp., under the following measuring conditions, a calibration curve was prepared with a standard polystyrene and the weight-average molecular weight was measured.

Columns used: Shim-Pack series made by SHIMADZU CORPORATION GPC-801C, GPC-804C, GPC-806C, GPC-8025C, GPC-800CP
    Solvent: chloroform
    Sample solution concentration: 0.2 wt/vol %
    Sample solution injection amount: 200 $\mu$l
    Solvent flow rate: 1.0 ml/min
    Temperature of pump, column, detector: 40° C.

(7) Biodegradability Test

A film specimen cut out of the 40 $\mu$m-thick film to the size of 100 mm in a longitudinal direction and 15 mm in a width direction was held by a 20-mesh net holder of SUS steel, and together with 20 kg of leaf mold which is fully matured, and 10 kg of dog food (vita-one made by Japan Pet Food), put in a home composter (Ecolompo EC-25D made by Shizuoka Seiki), left for 5 weeks while adding 500 cc water per day. The recovery rate after 5 weeks (that is, the rate of the part remaining in the holder) was measured.

Ones in which the recovery rate was 30% or under and decomposition proceeded clearly are indicated by ○, ones in which the recovery rate was 30–90% are indicated by Δ, and ones in which the recovery rate was 90% or over was indicated by x.

Example 1

EcoPLA3000D which is polylactic acid (made by CARGILL in USA and having a weight-average molecular weight of 230 thousand), and Bionolle #3001 (made by SHOWA HIGH POLYMER CO., LTD. and having a weight-average molecular weight of 190 thousand, $Tg=-45°$ C.) comprising a condensation product of 1,4-butanediol and succinic acid and adipic acid were dried to remove moisture, mixed and melted in a 25 mm-dia. small co-rotating twin-screw extruder at the weight ratio of 50:50 and extruded into the shape of strands at 200° C. to form pellets. Next, the pellets obtained were sufficiently dehumidified and dried, and using a 30 mm-dia. small single-screw extruder, a 40 $\mu$m-thick nonoriented film was formed at the casting temperature of 52° C. The evaluation results of the polylactic acid used and the film obtained are shown in Table 1.

For comprehensive evaluation in Table 1, ones which are good in all of tensile elongation, tensile modulus of elasticity, heat-sealability and biodegradability are indicated by ⊚, one in which some of them are inferior but which can withstand practical use are indicated by ○, and ones in which some of them are inferior and which cannot withstand practical use are indicated by x.

Examples 2 and 3

Except that the ratios of EcoPLA3000D and Bionolle #3001 were changed as shown in Table 1, a 40 $\mu$m-thick film was manufactured in the same manner as in Example 1. The evaluation results are shown in Table 1.

Example 4

Instead of EcoPLA3000D used in Example 1, using L-lactic acid/glicolic acid copolymer formed by the known ring opening polymerization using tin octylate as a catalyst (lactic acid:glycolic acid=90:10, weight-average molecular weight: 185 thousand, $Tg=-45°$ C. (hereinafter referred to as copolymer 1), a film was manufactured in the same manner. Evaluation results are shown in Table 1.

Comparative Example 1

Instead of EcoPLA3000D used in Example 1, EcoPLA2000D (made by CARGILL, weight-average molecular weight: 260 thousand) was used to manufacture a film in the same manner. Evaluation results are shown in Table 1.

Comparative Example 2

Instead of EcoPLA3000D used in Example 1, LACTY 1000 (made by SHIMADZU Corporation, weight-average molecular weight: 220 thousand) was used to form a film in the same manner. Evaluation results are shown in Table 1.

Comparative Examples 3 and 4

Except that the ratios of EcoPLA3000D and Bionolle #3001 were changed as shown in Table 1, a 40 $\mu$m-thick film was manufactured in the same manner as in Example 1. Evaluation results are shown in Table 1.

Example 5

Instead of Bionolle #3001 used in Example 1, using Bionolle #3030 (weight-average molecular weight: 85 thousand, $Tg=-45°$ C.), a film was manufactured in the same manner. Evaluation results are shown in Table 1.

Example 6

Instead of Bionolle #3001 used in Example 1, using Biopol D400G (polyhydroxy valerianic acid made by ZENECA, weight-average molecular weight: 900 thousand, $Tg=5°$ C.), a film was manufactured in the same manner. Evaluation results are shown in Table 1.

In Examples 1–4, which are within the range of the present invention, tensile elongation was high, shock resistance was superior, heat-seal strength did not change so markedly after aging, and strength was good.

On the other hand, in Comparative Examples 1 and 2, the fusion heat amount $\Delta Hm_2$ during secondary heating of the polylactic acid was high, and the fusion heat amount $\Delta Hm_1$ during primary heating of the film at a portion corresponding to the polylactic acid was high. This shows that the heat-seal strength dropped markedly when the film was subjected to aging.

Also, in Comparative Example 3, since the content of polylactic acid was too high, one can see that the tensile elongation of the film is 10% or under and thus it is brittle. Further, in Comparative Example 4, though it is superior in elongation and heat-sealability, tensile elastic modulus is small. Although this shows that the film was very flexible, since it was too soft, printing and laminating were difficult.

In Example 5, since the molecular weight of the aliphatic polyester was too low, tensile elongation was somewhat inferior, but it could withstand practical use. In Example 6, since the Tg of the aliphatic polyester was 0° C. or over, tensile elongation was small and brittleness remained, but it could sufficiently withstand practical use.

Industrial Feasibility

The present invention provides a plastic film in which brittleness has been improved and which has superior heat-sealability and biodegradability in natural environment.

TABLE 1

| | Ex. 1 | Ex. 2 | Ex. 3 | Ex. 4 | Compara. Ex. 1 | Compara. Ex. 2 | Compara. Ex. 3 | Compara. Ex. 4 | Compara. Ex. 5 | Compara. Ex. 6 |
|---|---|---|---|---|---|---|---|---|---|---|
| Polylactic acid family polymer (A) | | | | | | | | | | |
| Product name | EcoPLA3000D | EcoPLA3000D | EcoPLA3000D | Copolymer 1*1 | EcoPLA 2000D | LACTY 1000 | | | EcoPLA3000D | |
| Δ Hm$_2$ Fusion heat of crystal | 0.5 | 0.5 | 0.5 | 0.3 | 4.6 | 40.2 | | | 0.5 | |
| Aliphatic polyester (B) | | | | | | | | | | |
| Product name | | | | | BIONOLLE #3001 | | | | BIONOLLE #3030 | Biopole D400G |
| Molecular weight | | | | | MW = 190000 | | | | MW = 85000 | MW = 900000 |
| Tg | | | | | Tg = −45° C. | | | | Tg = −45° C. | Tg = −5° C. |
| Biodegradable film | | | | | | | | | | |
| Weight ratio (A:B) | 50:50 | 70:30 | 30:70 | 50:50 | 50:50 | 50:50 | 85:15 | 10:90 | 50:50 | 50:50 |
| Δ Hm$_1$ Fusion heat converted to polylactic acid polymer | 31.0 | 30.5 | 32.8 | 6.2 | 41.4 | 43.0 | 30.3 | 32.5 | 31.5 | 32.9 |
| Tensile elongation (%) | | | | | | | | | | |
| MD | 400 | 200 | 650 | 380 | 420 | 500 | 8 | 750 | 90 | 30 |
| TD | 350 | 30 | 780 | 340 | 450 | 640 | 6 | 890 | 70 | 20 |
| Tensile modulus (kgf/mm$^2$) | | | | | | | | | | |
| MD | 180 | 260 | 130 | 190 | 180 | 190 | 320 | 70 | 160 | 280 |
| TD | 150 | 270 | 120 | 160 | 170 | 160 | 340 | 60 | 140 | 290 |
| Heat seal strength (kg/15 mm) | | | | | | | | | | |
| Before aging | 2.58 | 2.40 | 2.14 | 2.62 | 1.53 | 1.35 | 1.70 | 1.45 | 1.15 | 1.52 |
| After aging | 2.28 | 2.15 | 1.93 | 2.53 | 0.04 | 0.03 | 0.25 | 1.37 | 1.05 | 1.49 |
| Biodegradability | ○ | ○ | ○ | ○ | ○ | ○ | ○ | ○ | ○ | ○ |
| Evaluation | ⊚ | ⊚ | ⊚ | ⊚ | x | x | x | x | ○ | ○ |

*1 L-copolymer of lactic acid and glycoholic acid

What is claimed is:

1. A biodegradable film comprising a polylactic acid-family polymer whose fusion heat of crystal ΔHm$_2$ when secondary temperature raising is carried out is 3 J/g or under and other aliphatic polyester than the polylactic acid-family polymer at the weight ratio of 80:20 to 20:80, characterized in that the heat for fusion ΔHm1 converted to the polylactic acid-family polymer when the temperature of the film is raised is 35 J/g or under.

2. The biodegradable film as claimed in claim 1 characterized in that the aliphatic polyester has a weight-average molecular weight of 20 to 300 thousand and has the structure expressed by the following formula (1)

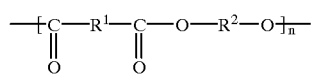

(1)

(wherein R1 and R2 are alkylene or cycloalkylene groups having 2 to 10 carbon atoms, n is the degree of polymerization required for the weight-average molecular weight to be 20–300 thousand, R1 or R2 may be identical to or different from each other, and in the formula, instead of ester-bound residue, urethane-bound residue and/or carbonate-bound residue may be contained up to 5%).

3. The biodegradable film as claimed in claim 2 wherein the glass transition point of said aliphatic polyester is 0° C. or lower.

4. The biodegradable film as claimed in claim 2 wherein the weight-average molecular weight of said aliphatic polyester is 150 to 250 thousand.

5. The biodegradable film as claimed in claim 2 wherein the weight-average molecular weight of said polylactic acid-family polymer is 100 to 300 thousand.

6. The biodegradable film as claimed in claim 1 wherein the glass transition point of said aliphatic polyester is 0° C. or lower.

7. The biodegradable film as claimed in claim 1 wherein the weight-average molecular weight of said aliphatic polyester is 150 to 250 thousand.

8. The biodegradable film as claimed in claim 1 wherein the weight-average molecular weight of said polylactic acid-family polymer is 100 to 300 thousand.

* * * * *